J. H. FULLER & A. MILLER.
FISHING DEVICE.
APPLICATION FILED AUG. 15, 1911.
1,038,866.
Patented Sept. 17, 1912.
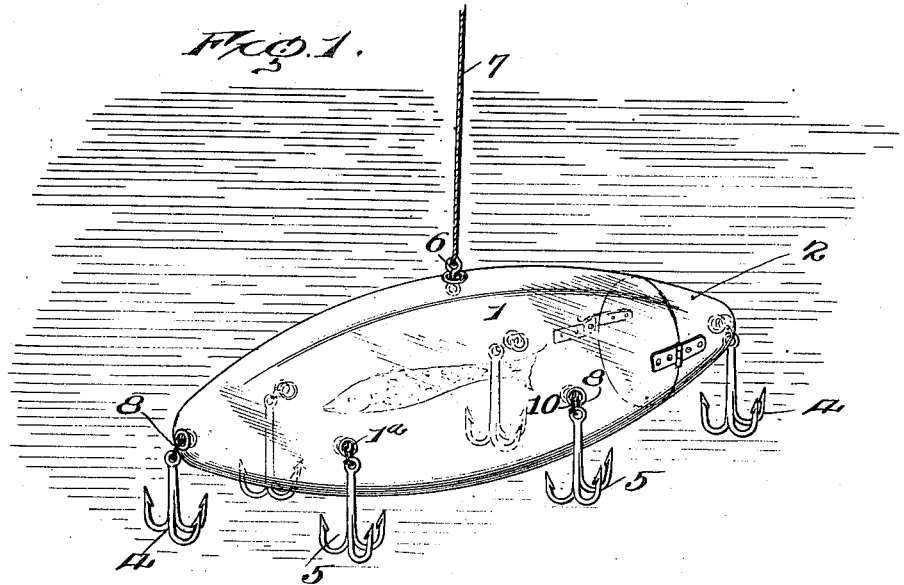
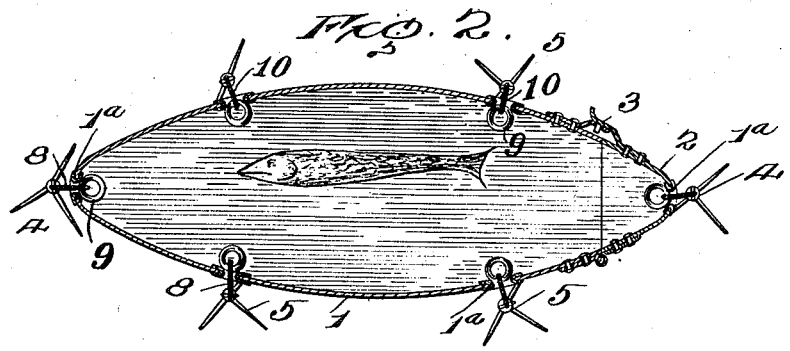
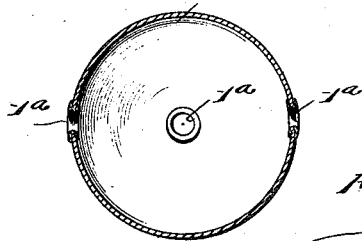
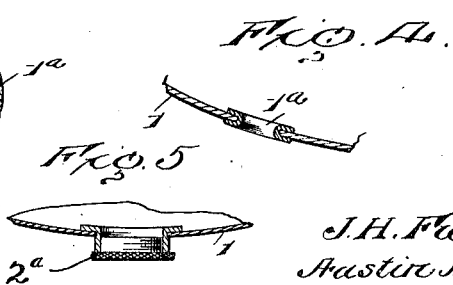
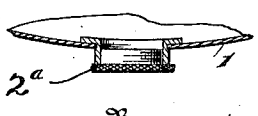
Witnesses
Inventor
J. H. Fuller
Austin Miller
By
Attorneys.

UNITED STATES PATENT OFFICE.

JAMES H. FULLER AND AUSTIN MILLER, OF MOBERLY, MISSOURI.

FISHING DEVICE.

1,038,866.　　　　　　Specification of Letters Patent.　　Patented Sept. 17, 1912.

Application filed August 15, 1911. Serial No. 644,220.

*To all whom it may concern:*

Be it known that we, JAMES H. FULLER and AUSTIN MILLER, citizens of the United States, residing at Moberly, in the county of Randolph and State of Missouri, have invented certain new and useful Improvements in Fishing Devices, of which the following is a specification.

This invention comprehends certain new and useful improvements in fishermen's accessories, and relates particularly to live bait retainers.

The main object is to provide a transparent bait tube or retainer in which the live bait is placed, without mutilation, and used therein either for still fishing or trolling. A single live bait can thus be used repeatedly, as it is neither injured by being attached to a hook or mutilated or devoured by the quarry.

A further object is to provide a device for bait suspension in which the bait is surrounded by a number of hooks, thereby insuring the securing of the quarry when it strikes at the bait.

With these and other objects in view as will more fully appear as the description proceeds, the invention consists in certain constructions, arrangements and combinations of the parts that we shall hereinafter fully describe and claim.

For a full understanding of the invention reference is to be had to the following description and accompanying drawing, in which:

Figure 1 is a perspective view of our device in operation; Fig. 2 is a horizontal sectional view of the same; Fig. 3 is a vertical transverse sectional view; Fig. 4 is a section through an eyelet showing its construction; Fig. 5 is a vertical sectional view of a detachable cap affording access to the retainer at the base thereof.

Corresponding and like parts are referred to in the following description and indicated in all the views of the accompanying drawing by the same reference characters.

Referring to the drawing, the numeral 1 designates a transparent, preferably oblong, curvilinear retainer, one end of which is formed by a cap 2 of the same material which is pivotally attached to the retainer 1 and provided with a suitable clasp 3 for securing the said cap 2 to the said retainer 1, thus closing the latter. At either end of the retainer and on the outside thereof are the fish hooks 4 which are securely attached to the periphery of the same, preferably by a swivel device 8 as shown. At spaced distances intermediate the ends of said retainer are other hooks 5, similarly attached. A suspending swivel 6 to which is attached a controlling line 7 is securely mounted in the wall of the retainer intermediate the ends thereof.

Attention is called to the construction of the swiveling devices 8 which suspend the hooks, each swiveling device embodying a ring 9 slightly larger than the opening in the eyelets $1^a$, said ring being disposed within the retainer, adapted to engage the eyelet and connected to the adjacent hook by a flexible member preferably in the form of a cord 10, thus making it relatively easy by severing the cords to remove the hooks for replacement or to vary their arrangement.

From the foregoing description in connection with the accompanying drawing the operation of the live bait retainer will be apparent. The retainer 1 is opened by pivoting the cap 2 and after a live bait is placed within the retainer, said cap is securely fastened in place. The device is then submerged in the usual way and held in suspension by the line 7. The live bait within the tube being in its natural element and physically intact, conducts itself naturally and in full view of the quarry, thus increasing the chances for the latter insnaring itself upon the hooks 4 and 5 assembled for that purpose about the entrapped bait.

In the preferred embodiment of the device the retainer is formed with eyelet-reinforced openings $1^a$ in which the swivels 8 of the hooks are mounted.

It will be noted that access to the device is provided for by the cap 2 which is formed of the same material as the body portion and conforms to the shape thereof, which construction is a material advantage as the entire device is thus made transparent and the entrapped bait is visible to the quarry from all outside points. Moreover the tapered ends offer little resistance in moving through the water so that with slight changes in the method of suspension the retainer can be used for trolling as well as still fishing.

It is of course to be understood that the device is not limited to the construction explained in the preceding description, as access could be had to the retainer through a screw cap 2ª secured to the bottom of the retainer, as shown in Fig. 5, in which case both ends of the retainer would be integral therewith instead of one being detachable as at 2.

Having thus described the invention, what is claimed as new is:

A fishing device comprising an oblong curvilinear transparent hollow retainer having pointed ends, a line connected with the upper part of the retainer at a point midway between the ends thereof, said retainer having at its sides openings which communicate with the interior thereof, and hooks connected with the retainer at the openings thereof.

In witness whereof, we affix our signatures in presence of two witnesses.

JAMES H. FULLER. [L. S.]
AUSTIN MILLER. [L. S.]

Witnesses:
 Wm. B. Stewart,
 H. D. McMaster.